United States Patent
Fisher

(10) Patent No.: US 10,988,413 B2
(45) Date of Patent: *Apr. 27, 2021

(54) CALCIUM SULPHATE-BASED PRODUCTS

(71) Applicant: CertainTeed Gypsum, Inc., Malvern, PA (US)

(72) Inventor: Robin Fisher, Loughborough (GB)

(73) Assignee: CertainTeed Gypsum, Inc., Malvern, PA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/161,591

(22) Filed: Oct. 16, 2018

(65) Prior Publication Data
US 2019/0047912 A1 Feb. 14, 2019

Related U.S. Application Data

(63) Continuation of application No. 14/654,300, filed as application No. PCT/EP2013/077315 on Dec. 19, 2013, now Pat. No. 10,131,577.

(30) Foreign Application Priority Data

Dec. 21, 2012 (GB) .................................. 1223312.8

(51) Int. Cl.
*B32B 13/00* (2006.01)
*C04B 11/00* (2006.01)
(Continued)

(52) U.S. Cl.
CPC .............. *C04B 11/00* (2013.01); *B32B 13/00* (2013.01); *C04B 28/14* (2013.01);
(Continued)

(58) Field of Classification Search
None
See application file for complete search history.

(56) References Cited

U.S. PATENT DOCUMENTS 3,822,340 A 7/1974 Ebert et al.
4,729,853 A 3/1988 von Bonin
(Continued)

FOREIGN PATENT DOCUMENTS

CN 101522410 9/2009
CN 101734897 A 6/2010
(Continued)

OTHER PUBLICATIONS

Nov. 1, 2017 Office Action issued in Japanese Patent Application No. 2015-548556.
(Continued)

*Primary Examiner* — Seth Dumbris
(74) *Attorney, Agent, or Firm* — McDonnell Boehnen Hulbert & Berghoff LLP

(57) ABSTRACT

This invention relates to improved high temperature resistant calcium sulphate-based products e.g. gypsum wallboard products and, in particular, to products having reduced shrinkage at high temperatures. The invention provides calcium sulphate-based product comprising gypsum and a shrinkage resistance additive. The shrinkage resistance additive is melamine polyphosphate or melamine pyrophosphate.

13 Claims, 3 Drawing Sheets

(51) Int. Cl.
*C04B 28/14* (2006.01)
*C04B 103/56* (2006.01)
*C04B 103/63* (2006.01)
*C04B 111/00* (2006.01)
*C04B 111/28* (2006.01)

(52) U.S. Cl.
CPC ....... *B32B 2607/00* (2013.01); *C04B 2103/58* (2013.01); *C04B 2103/63* (2013.01); *C04B 2111/0062* (2013.01); *C04B 2111/28* (2013.01)

(56) References Cited

U.S. PATENT DOCUMENTS

| | | | |
|---|---|---|---|
| 4,740,527 | A | 4/1988 | von Bonin |
| 4,992,481 | A | 2/1991 | von Bonin |
| 6,166,114 | A | 12/2000 | Cosstick |
| 6,319,312 | B1 | 11/2001 | Luongo |
| 10,131,577 | B2 * | 11/2018 | Fisher .................... B32B 13/00 |
| 2002/0068775 | A1 | 6/2002 | Munzenberger |
| 2005/0250885 | A1 | 11/2005 | Mercx |
| 2007/0173572 | A1 | 7/2007 | Mediratta et al. |
| 2008/0171231 | A1 | 7/2008 | Lopez et al. |
| 2010/0136259 | A1 | 6/2010 | O'Keefe et al. |

FOREIGN PATENT DOCUMENTS

| | | |
|---|---|---|
| CN | 102584324 | 7/2012 |
| CN | 102746651 | 10/2012 |
| EP | 0258064 | 3/1988 |
| EP | 2256167 | 12/2010 |
| JP | S6065756 A | 4/1985 |
| JP | S60-204650 | 10/1985 |
| JP | 2000086323 A | 3/2000 |
| JP | 2002145655 A | 5/2002 |
| RU | 2420471 | 6/2011 |
| WO | WO 97/31056 | 8/1997 |
| WO | WO 99/08979 | 2/1999 |
| WO | WO 00/06518 | 2/2000 |
| WO | WO 2004/009691 | 1/2004 |
| WO | WO 2008/045217 | 4/2008 |
| WO | WO 2009/016129 | 2/2009 |
| WO | WO 2012/069826 | 5/2012 |

OTHER PUBLICATIONS

Sep. 5, 2017 Office Action issued in Russian Patent Application No. 2015129768/03(045941).

Kuznetsov, A.M., Technology of binding agents, higher school, Moscow, 1963, pp. 49-50.

Aug. 25, 2017 Office Action issued in Taiwanese Patent Application No. 102147463.

Aug. 25, 2017 Search Report issued in Taiwanese Patent Application No. 102147463.

Supplementary Search Report from corresponding Chinese Patent Application No. 2013800675674 dated Jan. 5, 2017.

Wang, Jianqi et al., Fundamentals and Applications of Halogen-Free Flame-Retardant Polymers, First Edition, Science Press; 2005, pp. 102-103.

International Search Report and Written Opinion for corresponding International Application No. PCT/EP2013/077315, dated Nov. 12, 2014.

Search Report for corresponding Great Britain Application No. 1223312.8 dated Jun. 4, 2013.

International Search Report for PCT/EP2013/077315 dated May 8, 2014.

* cited by examiner

CALCIUM SULPHATE-BASED PRODUCTS

CROSS-REFERENCE TO RELATED APPLICATIONS

This application is a continuation of U.S. patent application Ser. No. 14/654,300, filed Jun. 19, 2015, which is hereby incorporated herein by reference in its entirety. U.S. patent application Ser. No. 14/654,300 is a U.S. National Stage application under 35 U.S.C. 371 of International Patent Application no. PCT/EP2013/077315, filed Dec. 19, 2013, which claims the benefit of priority of U.K. Patent Application no. 1223312.8, filed Dec. 21, 2012.

This invention relates to improved high temperature resistant calcium sulphate-based products and, in particular, to calcium sulphate-based products having reduced shrinkage at high temperatures.

BACKGROUND

Calcium sulphate-based products are widely used in the construction of buildings, for example, to form internal partitions (using wallboard, also known as dry wall, gypsum board or plaster board) and ceilings or to encase ducts (e.g. ventilation ducts) within buildings.

Calcium sulphate-based products such as wallboard are typically formed by drying an aqueous slurry of the hemihydrate of calcium sulphate ($CaSO_4.½ H_2O$), also known as calcined gypsum or stucco, between two sheets of lining paper or fibreglass matting. As the slurry dries and the calcined gypsum is hydrated, a hard, rigid core of gypsum (calcium sulphate dihydrate—($CaSO_4.2H_2O$)) sandwiched between the lining sheets/mats is formed.

When wallboard or ceiling tiles are exposed to high temperatures such as those experienced in a building fire or those experienced by wallboards used for encasing ducts carrying high temperature fluids, the water of crystallization contained within the gypsum is driven off to yield the anhydrite of calcium sulphate. Initially, this has the advantage that heat transfer across the wallboard/ceiling tile is reduced thus helping to contain the heat emanating from ducting or generated during a building fire. However, at temperatures around 400-450° C., the initially formed AIII phase anhydrite (also known as γ-$CaSO_4$ or "soluble" anhydrite) converts to the AII phase (or "insoluble" anhydrite) and this phase change results in shrinkage of the wallboard/tile i.e. a loss of dimensional stability. This shrinkage (which may be around 2% of the wallboard's/tile's length or width, or around 6% of the wallboard's volume) often causes the wallboards to pull away from their supporting structures. This is obviously undesirable. It can leave ducts exposed to high temperatures. Furthermore, in situations where wallboard is used for internal partitions and a fire breaks out, shrinkage can leaves gaps exposing rooms adjacent to the fire source to the effects of the heat/fire. Gaps also allow ingress of oxygen into the fire source thus fuelling the fire and negating the effects of any fire doors.

At higher temperatures (in excess of 600° C.), the insoluble anhydrite goes on to sinter resulting in large reductions in wallboard volume. This results in extreme shrinkage which eventually causes collapse of the internal walls/ceilings/duct casings as they are no longer held by their supporting structures.

Efforts have been made to improve the heat resistance of calcium sulphate-based products such as wallboard in an attempt to reduce shrinkage.

It is known e.g. from EP0258064 to use micro silica as an additive in the gypsum core of wallboard to reduce shrinkage.

However, these additives only have an effect at temperatures greater than 600° C. i.e. they do not resist the shrinkage of the board at lower temperatures and linear shrinkage of more than 10% is still seen as temperatures around 1000° C.

It is known from WO99/08979 and WO00/06518 to add sodium trimetaphosphate (STMP), sodium hexametaphosphate (SHMP) or ammonium polyphosphate (APP) to a calcium sulphate wallboard core to improve strength, sag resistance and shrinkage during drying. No effect of these additives on shrinkage during exposure to high temperatures is recorded. The trimetaphosphate ions and APP were found to accelerate the rate of hydration of calcined gypsum thus decreasing the set time for the wallboard core.

WO2012/069826 discloses use of aluminium and ammonium phosphate additives for enhancing fire resistance of calcium sulphate-based products. Ammonium polyphosphate (APP) was found to reduce hydration time of the calcined gypsum and accelerate setting time.

Calcium sulphate-based products are also used to cast metal objects. Calcium sulphate moulds are heated to 700-900° C. prior to being filled with molten metal. It is important to control high temperature shrinkage of such calcium sulphate-based moulds to ensure that the moulds do not leak and to ensure that the cast metal products are not warped.

A preferred aim of the present invention is to provide an improved heat resistant calcium sulphate-based product having reduced shrinkage after heat exposure e.g. when in contact with ducting, during a building fire or during casting of metal products. Such an improved heat resistant product may have particular use as wallboard or panels for forming internal partitions in buildings, ceiling tiles, wallboard or panels for encasing ventilation/smoke extraction ducting, joint filler materials for joining wallboard/panels/tiles or for moulds for use in metal product casting.

SUMMARY OF THE INVENTION

Accordingly, in a first aspect, the present invention provides a calcium sulphate-based product comprising gypsum and a shrinkage resistance additive wherein the shrinkage resistance additive is melamine polyphosphate or melamine pyrophosphate.

Melamine polyphosphate is $C_3H_6N_6.(H_3PO_4)_n$ where n is greater than 2. Melamine pyrophosphate is $C_3H_6N_6.(H_3PO_4)_n$ where n is two.

The inventors have found that including melamine polyphosphate (MPP) or melamine pyrophosphate in the calcium sulphate based products e.g. the gypsum core of a wallboard reduces shrinkage of the wallboard when the board is exposed to high temperatures. Unlike micro silica which only has an effect above 600° C., MPP/melamine pyrophosphate begins to have an effect around 350° C. where it undergoes an endothermic decomposition (to yield phosphoric acid) and thus acts as a heat sink. The MPP also acts to increase the temperature at which the transition from the soluble to insoluble calcium sulphate anhydrite occurs thus allowing the product to resist the shrinkage arising from the phase change until higher temperatures (around 800° C.) are reached.

The term "calcium sulphate-based product" may include wallboards (with or without liners) (with or without fibrous reinforcement), tiles (e.g. ceiling tiles), duct encasement panels, joint filler materials (e.g. for joining adjacent wallboards/tiles/panels etc.) and moulds for casting metal products.

The calcium sulphate-based product may be a composite product e.g. it may be a wallboard having a gypsum matrix core (containing the shrinkage resistance additive) sandwiched between two liners (e.g. paper liners or fibreglass matting).

The term "gypsum" is intended to refer predominantly to calcium sulphate dihydrate ($CaSO_4.2H_2O$).

MPP is used as the shrinkage resistance additive in preferred embodiments. Unlike APP which has been found to accelerate the setting of the hemihydrate (calcined gypsum) to the dihydrate (gypsum) of the gypsum, it has been found that MPP does not cause any acceleration. Acceleration of the setting is undesirable because it restricts the possible addition level and gives the production plant less control over their processes. In fact, MPP has been found to cause a slight retardation of the setting.

Preferably, the MPP/melamine pyrophosphate shrinkage resistance additive is included in an amount from 0.1 to 20 wt %, preferably 1 to 10 wt %, more preferably 1 to 5 wt % and most preferably 2 to 5 wt %.

Preferably, the calcium sulphate-based product does not contain glass fibres. The glass fibres are typically used form a mechanical network within the gypsum which helps maintain the structural integrity of the product after exposure to heat. However, the present inventors believe that the inclusion of MPP/melamine pyrophosphate may reduce shrinkage by such an amount that the structural integrity can be maintained without using glass fibres.

The calcium sulphate-based product may contain additives such as accelerators to off-set the slight retardation of the set time observed for MPP. The accelerators may be, for example, freshly ground gypsum having an additive of sugar or surfactant. Such accelerators may include Ground Mineral NANSA (GMN), heat resistant accelerator (HRA) and ball milled accelerator (BMA). Alternatively, the accelerator may be a chemical additive such as aluminium sulphate, zinc sulphate or potassium sulphate. In certain cases, a mixture of accelerators may be used, e.g. GMN in combination with a sulphate accelerator. As a further alternative, ultrasound may be used to accelerate the setting rate of the slurry, e.g. as described in US2010/0136259.

In a second aspect, the present invention provides a method of forming a calcium sulphate-based product by drying an aqueous slurry comprising calcined gypsum and shrinkage resistance additive wherein the shrinkage resistance additive is melamine polyphosphate or melamine pyrophosphate.

The term "calcium sulphate-based product" may include wallboards (with or without liners) (with or without fibrous reinforcement), tiles (e.g. ceiling tiles), duct encasement panels, joint filler materials (e.g. for joining adjacent wallboards/tiles/panels etc.) and moulds for casting metal products.

The calcium sulphate-based product may be a composite product e.g. it may be a wallboard having a gypsum matrix core (containing the shrinkage resistance additive) sandwiched between two liners (e.g. paper liners or fibreglass matting). In this embodiment, the method comprises drying an aqueous slurry comprising calcined gypsum and MPP between two liners (e.g. paper liners or fibreglass matting).

The term "calcined gypsum" is intended to refer predominantly to calcium sulphate hemihydrate ($CaSO_4.2H_2O$) but may also encompass any other calcium sulphate compound having a lower bound water content than calcium sulphate dihydrate (e.g. calcium sulphate anhydrite).

Preferably, the MPP/melamine pyrophosphate shrinkage resistance additive is included in the slurry in an amount from 0.1 to 20 wt %, preferably 1 to 10 wt %, more preferably 1 to 5 wt % and most preferably 2 to 5 wt %.

The preferred shrinkage resistance additive is MPP. This has been found not to accelerate the setting time of calcined gypsum, unlike APP.

The calcium sulphate-based product preferably contains no glass fibres. The glass fibres are typically used to form a mechanical network within the gypsum which helps maintain the structural integrity of the product after exposure to heat. The present inventors believe that the addition of MPP/melamine pyrophosphate reduces high temperature shrinkage to such an extent that the glass fibres are no longer necessary. Therefore, preferably, the method comprises drying an aqueous slurry comprising gypsum and MPP/melamine pyrophosphate in the absence of inorganic (glass) fibres.

The method may comprise adding glass matting to the slurry prior to drying. The slurry is typically dried in a mould. The matting may be added by laying it onto the surface of the slurry after some or all of the slurry has been added to the mould or it may be laid in the bottom of the mould before the slurry is added. If the matting is laid in the base of the empty mould or laid on the surface of the slurry of the full mould then the matting will rest at the surface of the gypsum core. If it is added to the mould when only some of the slurry has been added, it will be embedded within the gypsum core.

The calcium sulphate-based product may contain additives such as accelerators. The accelerators may be, for example, freshly ground gypsum having an additive of sugar or surfactant. Such accelerators may include Ground Mineral NANSA (GMN), heat resistant accelerator (HRA) and ball milled accelerator (BMA). Alternatively, the accelerator may be a chemical additive such as aluminium sulphate, zinc sulphate or potassium sulphate. In certain cases, a mixture of accelerators may be used, e.g. GMN in combination with a sulphate accelerator. In these embodiments, the method comprises drying an aqueous slurry comprising gypsum, MPP/melamine pyrophosphate and accelerator, optionally between two liners as discussed above. Glass matting may also be included (as discussed above) along with the accelerator.

In a third aspect, the present invention provides the use of melamine polyphosphate/melamine pyrophosphate as an additive in a gypsum matrix for reducing shrinkage in a calcium sulphate-based product during heat exposure.

Preferably, the MPP/melamine pyrophosphate is used as an additive for reducing shrinkage in a composite wallboard having a gypsum core (containing MPP/melamine pyrophosphate) sandwiched between two liners (e.g. paper liners or fibreglass matting).

Preferably, an amount of from 0.1 to 20 wt %, preferably 1 to 10 wt %, more preferably 1 to 5 wt % and most preferably 2 to 5 wt % MPP/melamine pyrophosphate is used to reduce shrinkage in the product.

EXPERIMENTAL

Figure 1:
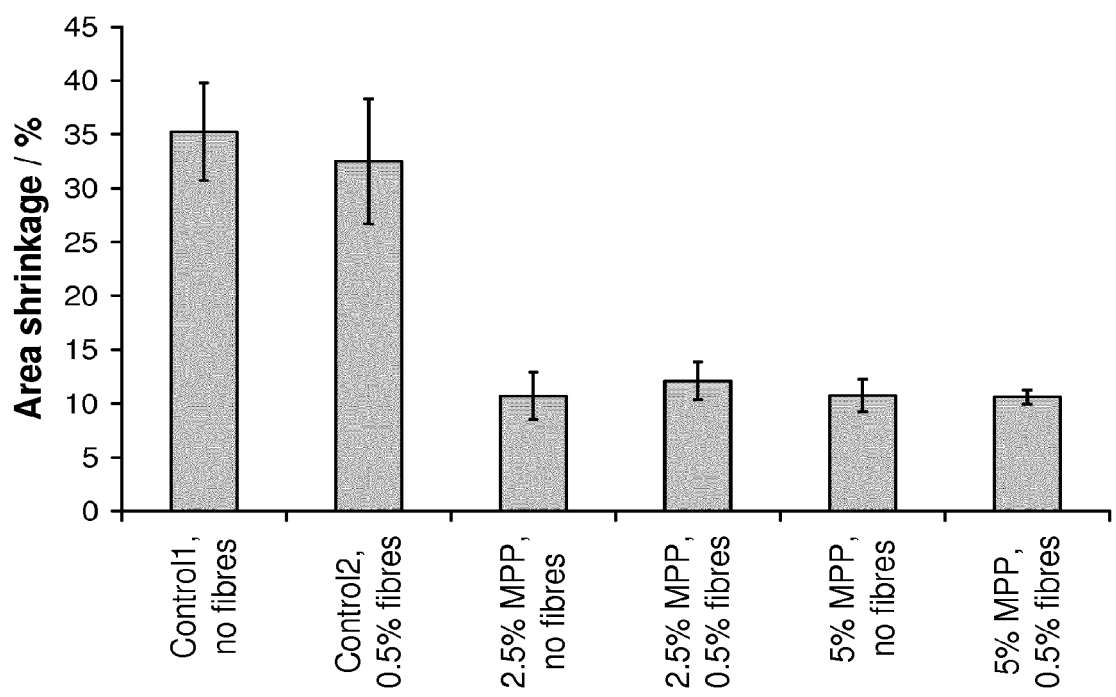
FIG. 1 shows a graph of area shrinkage for the control and MPP samples after heating to 1000° C. and subsequent cooling.

The following examples are given by way of illustration only.

Control Sample 1

1500 g of stucco was blended with 0.1 wt % (relative to the weight of the stucco) ground gypsum accelerator (GMN—Ground mineral NANSA) and added to 1350 g of water at 40° C. This was mixed for 10 seconds in a large Waring blender and the resulting slurry was poured 100×50×11 mm and 200×200×12.5 mm brass moulds to harden. The thumb set was less than 10 minutes. The thumb set is taken by depressing a thumb end onto a portion of the setting gypsum. The time is recorded when sufficient strength is attained such that an impression can no longer be made in the setting gypsum. After leaving the samples to hydrate for an hour, they were transferred to an oven at 40° C. and left to dry overnight (at least 12 hours).

Control Sample 2

1500 g of stucco was blended with 0.1 wt % ground gypsum accelerator. 0.5 wt % (based on the weight of the stucco) (i.e. 7.5 g) Johns Manville glass fibres were dispersed in 1350 g of water at 40° C. for 10 seconds and then the dry blend was added. This was mixed for 10 seconds in a large Waring blender and the resulting slurry was poured 100×50×11 mm and 200×200×12.5 mm brass moulds to harden. The thumb set was less than 10 minutes. After leaving the samples to hydrate for an hour, they were transferred to an oven at 40° C. and left to dry overnight (at least 12 hours).

MPP Sample 1

1500 g of stucco was blended with 0.3 wt % (based on the weight of stucco) ground gypsum accelerator. 2.5 wt % MPP (based on weight of stucco) was dispersed in 1350 g of water at 40° C. for 10 seconds and then the dry blend was added. This was mixed for 10 seconds in a large Waring blender and the resulting slurry was poured 100×50×11 mm and 200×200×12.5 mm brass moulds to harden. The thumb set was less than 10 minutes. After leaving the samples to hydrate for an hour, they were transferred to an oven at 40° C. and left to dry overnight (at least 12 hours).

MPP Sample 2

1500 g of stucco was blended with 0.3 wt % (based on the weight of stucco) ground gypsum accelerator. 0.5% Johns Manville glass fibres and 2.5 wt % MPP (based on weight of stucco) were dispersed in 1350 g of water at 40° C. for 10 seconds and then the dry blend was added. This was mixed for 10 seconds in a large Waring blender and the resulting slurry was poured 100×50×11 mm and 200×200×12.5 mm brass moulds to harden. The thumb set was less than 10 minutes. After leaving the samples to hydrate for an hour, they were transferred to an oven at 40° C. and left to dry overnight (at least 12 hours).

MPP Sample 3

1500 g of DSG Stucco was blended with 0.5 wt % (based on the weight of stucco) ground gypsum accelerator. 5 wt % MPP (based on weight of stucco) was dispersed in 1350 g of water at 40° C. for 10 seconds and then the dry blend was added. This was mixed for 10 seconds in a large Waring blender and the resulting slurry was poured 100×50×11 mm and 200×200×12.5 mm brass moulds to harden. The thumb set was less than 10 minutes. After leaving the samples to hydrate for an hour, they were transferred to an oven at 40° C. and left to dry overnight (at least 12 hours).

MPP Sample 4

1500 g of DSG Stucco was blended with 0.5 wt % (based on the weight of stucco) ground gypsum accelerator. 0.5% Johns Manville glass fibres and 5 wt % MPP (based on weight of stucco) were dispersed in 1350 g of water at 40° C. for 10 seconds and then the dry blend was added. This was mixed for 10 seconds in a large Waring blender and the resulting slurry was poured 100×50×11 mm and 200×200×12.5 mm brass moulds to harden. The thumb set was less than 10 minutes. After leaving the samples to hydrate for an hour, they were transferred to an oven at 40° C. and left to dry overnight (at least 12 hours).

TABLE 1

Summary of MPP Samples

| | Control 1 | Control 2 | MPP 1 | MPP 2 | MPP 3 | MPP 4 |
|---|---|---|---|---|---|---|
| Calcined gypsum/g | 1500 | 1500 | 1500 | 1500 | 1500 | 1500 |
| Water/g | 1350 | 1350 | 1350 | 1350 | 1350 | 1350 |
| Accelerator/g | 1.5 | 1.5 | 4.5 | 4.5 | 7.5 | 7.5 |
| Glass Fibres/g | — | 7.5 | — | 7.5 | — | 7.5 |
| MPP/g | — | — | 37.5 | 37.5 | 75 | 75 |

Melamine Pyrophosphate Sample 1

2.5 wt % melamine pyrophosphate (based on weight of stucco) was dispersed in 140 mL of tap water for 5 minutes using an Ultra-Turrax high shear mixer and then 200 g of stucco was added. This was mixed by hand for 1 minute and the resulting slurry was formed into 12.5 mm diameter gypsum cylinders. They were transferred to an oven at 40° C. and left to dry overnight (at least 12 hours).

For comparison with this melamine pyrophosphate, gypsum cylinders a) as above but with no melamine pyrophosphate, b) as above but with 2.5 wt % MPP instead of melamine pyrophosphate and c) as above but with no melamine pyrophosphate and 2.0 wt % (based on weight of stucco) micro silica. The results of the comparison are discussed below and shown in FIG. 3.

Area Shrinkage

For each of the 100×50×11 mm samples, the initial measurements (length and width) were recorded and then the samples heated to around 1000° C. over 120 mins (at 20° C./min up to around 200° C. and thereafter at a steadily and slowly decreasing rate). After cooling, the sample's dimensions were re-measured. The area shrinkage was calculated as the difference between the initial area of the sample and the heat treated sample and is shown in FIG. 1.

It can be seen that all samples containing MPP showed a considerable reduction in area shrinkage compared to the control samples containing no MPP. The reduction in shrinkage is achieved with as little as 2.5 wt % MPP. Indeed, doubling the amount of MPP to 5 wt % does not show a significant further reduction in area shrinkage.

The samples were inspected for cracks and the results are shown below in Table 2.

TABLE 2

Observations after heating to 1000° C.

| | Observations |
|---|---|
| Control sample 1 | Numerous visible cracks - some very wide - sample disintegrated |
| Control sample 2 | Numerous visible cracks |
| MPP sample 1 | A couple of very fine cracks |
| MPP sample 2 | A couple of very fine cracks |
| MPP sample 3 | A couple of very fine cracks |
| MPP sample 4 | A couple of very fine cracks |

Linear Shrinkage

Figure 2:
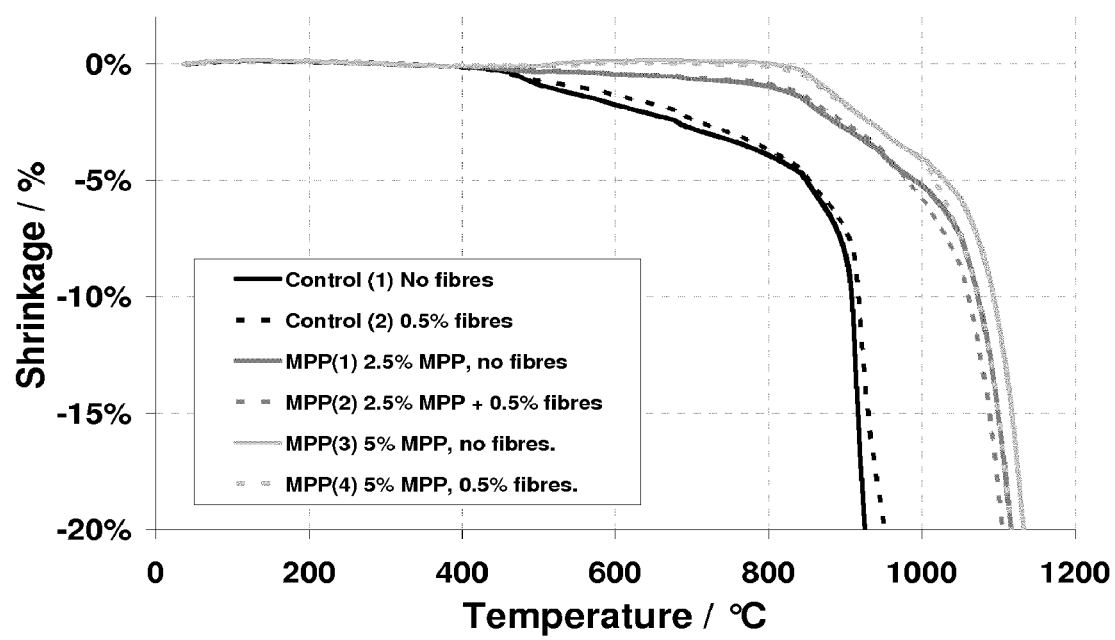
FIG. 2 shows a graph of linear shrinkage for the control and MPP samples during heating to 1000° C.

The linear shrinkage of the 200×200×12.5 mm samples was measured using a ceramic rod attached to a linear displacement transducer. The samples were supported by other ceramic rods and the heated in a furnace to 1000° C. at an initial rate of around 44° C./min up to around 600° C. and then at a steadily and slowly decreasing rate (in line with ISO 834). The results are shown in FIG. 2.

It can be seen that the linear shrinkage at 1000° C. is reduced to around 5% for all samples containing MPP. The biggest reduction in linear shrinkage was seen in the samples containing 5% MPP.

Figure 3:
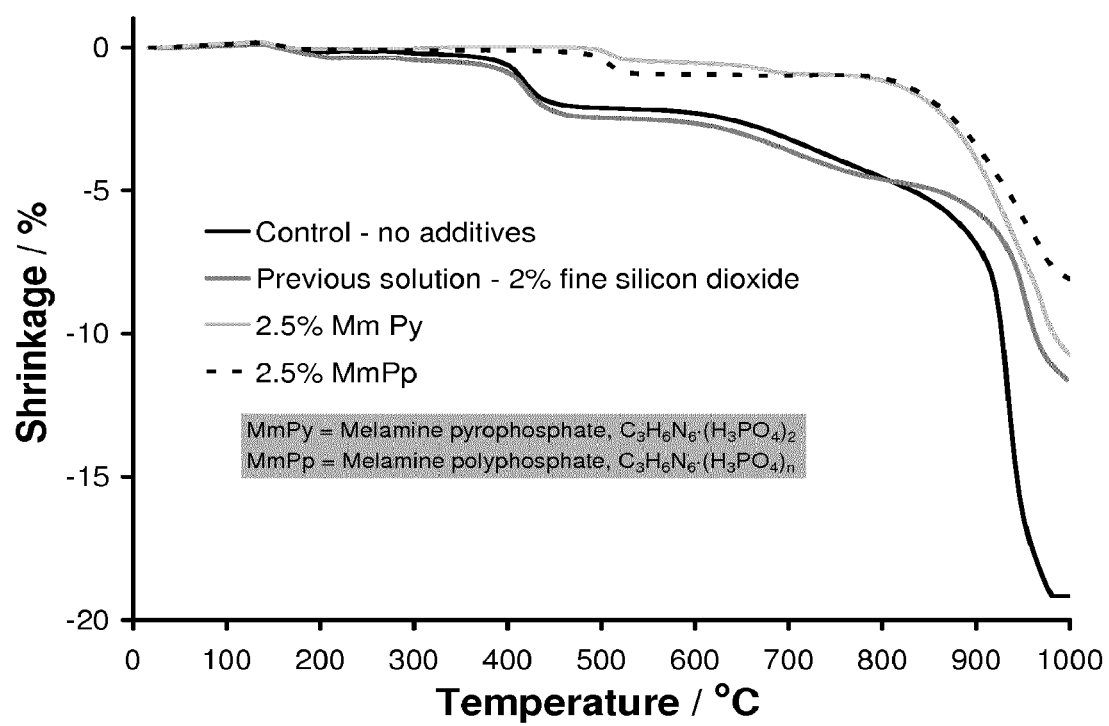
FIG. 3 shows a graph of linear shrinkage for the control, MPP and melamine pyrophosphate samples during heating to 1000° C.

FIG. 3 shows the linear shrinkage results for melamine pyrophosphate. It can be seen that the reduction in shrinkage is comparable to that obtained with the MPP i.e. a shrinkage of around 10% compared to around 19% for the control sample (with no melamine pyrophosphate).

The invention claimed is:

1. A gypsum product in the form of a composite wallboard comprising:
   a first liner and a second liner; and
   a core sandwiched between the first liner and the second liner, the core comprising a set gypsum composition comprising gypsum and a shrinkage resistance additive, wherein the shrinkage resistance additive is melamine polyphosphate, melamine pyrophosphate or a combination thereof, the shrinkage-resistant additive being present in an amount such that the gypsum product has an area shrinkage of between 8-14% after heating to a temperature of 1000° C. over 120 minutes.

2. The gypsum product according to claim 1, wherein the shrinkage resistance additive is melamine polyphosphate.

3. The gypsum product according to claim 1, wherein the shrinkage resistance additive is melamine pyrophosphate.

4. The gypsum product according to claim 1, wherein the shrinkage resistance additive is present in the set gypsum composition in an amount from 0.1-20 wt %.

5. The gypsum product according to claim 1, wherein the shrinkage resistance additive is present in the set gypsum composition an amount from 1-10 wt %.

6. The gypsum product according to claim 1, wherein the shrinkage resistance additive is present in the set gypsum composition an amount from 1-5 wt %.

7. The gypsum product according to claim 1, wherein the shrinkage resistance additive is present in the set gypsum composition an amount from 2-5 wt %.

8. The gypsum product according to claim 1, wherein the core does not include inorganic fibers.

9. The gypsum product according to claim 1, wherein the core does not include glass fibers.

10. The gypsum product according to claim 1, made by a process comprising:
    forming an aqueous slurry comprising stucco and the shrinkage resistance additive in water; allowing the aqueous slurry to set via hydration of the stucco to gypsum; and drying the set slurry to form the set gypsum composition.

11. The gypsum product according to claim 10, wherein the slurry further comprises an accelerator.

12. The gypsum product according to claim 11, wherein the accelerator includes one or more of ground gypsum including sugar or a surfactant; aluminium sulphate, zinc sulphate and potassium sulphate.

13. A gypsum product in the form of a composite wallboard comprising:
    a first liner and a second liner; and
    a core sandwiched between the first liner and the second liner, the core comprising a set gypsum composition comprising gypsum and a shrinkage resistance additive, wherein the shrinkage resistance additive is melamine polyphosphate, melamine pyrophosphate or a combination thereof, wherein the shrinkage resistance additive is present in the range of 1-2.5 wt %.

* * * * *